United States Patent [19]
Schirle et al.

[11] Patent Number: 5,956,203
[45] Date of Patent: Sep. 21, 1999

[54] DISK DRIVE HAVING AN INSERT WITH A CHANNEL FOR DIRECTING AIR FLOW TO A ROTARY ACTUATOR VOICECOIL

[75] Inventors: Neal B. Schirle, Morgan Hill; Steven A. Hanssen, San Jose, both of Calif.

[73] Assignee: International Business Machines Corporation, Armonk, N.Y.

[21] Appl. No.: 08/922,833

[22] Filed: Aug. 26, 1997

[51] Int. Cl.$^6$ .................................................. G11B 33/14
[52] U.S. Cl. ............................................................ 360/97.03
[58] Field of Search .............................. 360/97.02, 97.03, 360/97.04

[56] References Cited

U.S. PATENT DOCUMENTS

| | | | |
|---|---|---|---|
| 4,489,356 | 12/1984 | Farmer | 360/97.02 |
| 4,780,776 | 10/1988 | Dushkes | 360/97.02 |
| 5,025,336 | 6/1991 | Morehouse et al. | 360/97.02 |
| 5,031,059 | 7/1991 | Yamaguchi et al. | 360/97.03 |
| 5,134,530 | 7/1992 | Hall | 360/97.03 |
| 5,537,270 | 7/1996 | Morehouse et al. | 360/97.02 |
| 5,541,791 | 7/1996 | Yamasaki et al. | 360/105 |
| 5,602,700 | 2/1997 | Viskochil et al. | 360/105 |

FOREIGN PATENT DOCUMENTS

| | | |
|---|---|---|
| 55-125588 | 9/1980 | Japan. |
| 62-54888 | 3/1987 | Japan. |
| 63-112891 | 5/1988 | Japan. |
| 7-320478 | 12/1995 | Japan. |

*Primary Examiner*—David D. Davis
*Attorney, Agent, or Firm*—Noreen A. Krall; Jack V. Musgrove; Andrew J. Dillon

[57] ABSTRACT

A data storage device for a computer system, such as a hard disk drive (HDD), provides means for channeling air flow from the spinning disks to other components within the HDD enclosure that require cooling, particularly a voice coil motor having a coil which is used to move an actuator assembly. Channeling may be provided by forming a slot or gap in the disk cavity wall, or by providing an insert part which has a channel formed therein that directs air flow to the VCM coil.

1 Claim, 3 Drawing Sheets

DISK DRIVE HAVING AN INSERT WITH A CHANNEL FOR DIRECTING AIR FLOW TO A ROTARY ACTUATOR VOICECOIL

BACKGROUND OF THE INVENTION

1. Field of the Invention

The present invention generally relates to computer systems, and more particularly to a method of cooling components in a data storage device have moving parts which generate air flow, such as a hard disk drive having one or more spinning disks.

2. Description of the Related Art

Computer systems use a variety of devices for permanently storing data, i.e., in a non-volatile manner such that power to the computer system may be turned off but the data (including both user information and computer programs) are retained for future access. These storage devices typically use a magnetic or optical medium to preserve the data. The most common data storage device has one or more generally circular disks formed from a non-magnetic substrate with a ferromagnetic coating. The disks rotate or spin, and a pivoting arm having electromagnetic transducers is used to read from, and write to, the disks. Both surfaces (upper and lower) of a disk can be used. This magnetic storage device is commonly referred to as a hard disk drive (HDD), and is usually packaged in a modular enclosure so that it may be easily installed in and removed from the computer system. Many computer systems use multiple HDDs for greater storage capability, or for fault tolerance, such as in a redundant array of inexpensive disks (RAID).

The magnetic disk of a typical HDD is divided into several different areas according to industry standards. For example, many disks include a master boot record for storing technical specifications of the disk, a boot sector for storing basic operating system data, and multiple tracks for storing other data. The transducers at the tip of the pivoting arm (rotary actuator assembly) must be precisely aligned with these various areas on the disk in order to properly write to or read from the disk. In the well-known Whitney style technology, the rotary movement and positioning of the actuator assembly is controlled by a series of electrical signals emanating from the computer processor (or from a "controller" connected to the processor), which feed into a voice coil motor (VCM) of the actuator assembly. The VCM includes an electromagnetic coil (solenoid) attached to a portion of the pivoting arm, and one or more permanent magnets are affixed to the HDD enclosure such that a steady-state magnetic field from the magnets can be used in conjunction with the magnetic field from the VCM coil to cause the arm to rotate about its pivot point in a precise manner. Many HDDs provide a special magnetic pattern, or "servo surface," that allows the actuator assembly to identify its relative location on the disk. In this manner, an actuator assembly can be quickly moved to the approximate desired location, and then precisely adjusted to the exact location.

One concern that arises with the foregoing construction relates to cooling of the VCM coil. During periods of extended use, the electrical signals passing through the wires heat the coil, which can lead to various problems. For example, a change in coil temperature affects the resistivity of the wire and therefore changes the electromagnetic response of the VCM. This variable response can lead to increased actuator move time since it is more likely to require additional fine tuning of the transducer location. Cooling of the VCM coil has therefore become increasingly important as greater demands are placed on input/output (I/O) performance. Also, power in the VCM coil increases inversely to the fourth power of the move time, so there are very large increases in coil power for small decreases (improvements) in actuator move time. Of course, excessive heating of the VCM coil can result in overheating of other sensitive (semiconductor) components of the HDD. The problem of VCM coil cooling is further exacerbated by the increasingly diminutive size of HDD enclosures.

One approach used to cool the VCM coil is to provide vents in the enclosure, to allow increased air circulation, but this introduces additional problems. In particular, when the HDD enclosure is not airtight, there is a risk that dust or other contaminants can be introduced into the enclosure. Dust particles on the disk surface can strike the transducer head and upset its flight, resulting in a "crash" of the HDD, and can lead to data loss. For this reason, vented enclosures must be provided with an air filter to trap particles before they can enter the drive. Microscopic contaminants, including corrosive pollutants, can still pass through the filter, however, so this approach is unsatisfactory when the computer system may be operating in a highly polluted environment. Also, vents allow introduction of water vapor into the enclosure which can be harmful to many components. Some HDDs provide a desiccant within the enclosure to battle water vapor, increasing the complexity (and cost) of the HDD. Finally, providing a vent alone does not ensure increased air circulation and some systems must additionally provide a fan or similar means for directing air flow to the HDD enclosure vent. Accordingly, most modern HDD enclosures do not use a vent, although they do provide "breather" filters which allow the pressure inside the enclosure to equilibrate with ambient pressure, such as where ambient pressure changes due to temperature or altitude. It would, therefore, be desirable to devise an improved method of cooling the VCM coil which does not require venting of the enclosure. It would be further advantageous if the construction were relatively inexpensive and easily adapted to existing HDD designs.

SUMMARY OF THE INVENTION

It is therefore one object of the present invention to provide an improved hard disk drive for a computer system.

It is another object of the present invention to provide such a hard disk drive having an actuator assembly which includes a VCM coil, wherein the improvement lies in the cooling of the VCM coil.

It is yet another object of the present invention to provide an improved method of cooling the VCM coil which does not result in the potential introduction of contaminants within the disk drive enclosure.

The foregoing objects are achieved in a hard disk drive generally comprising an enclosure, at least one disk located in the enclosure and having a surface bearing a magnetic medium for storing data, the disk being attached to a spindle motor for spinning the disk such that air flow is generated near the surface, an actuator assembly for accessing the data stored on the magnetic medium, the actuator assembly including a rotary mounted arm member, at least one transducer supported by the arm member, at least one magnet attached to an interior portion of the enclosure, and a wire coil which acts as a solenoid to control movement of the arm member by interacting with the magnet, and means for channeling the air flow to the coil. The channeling means may comprise, e.g., a slot formed in a disk cavity wall, or an insert located in the enclosure, adjacent the disk and proximate to the actuator assembly, the insert having a channel formed therein, directing the air flow toward the coil.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF THE PREFERRED EMBODIMENT

Figure 1:
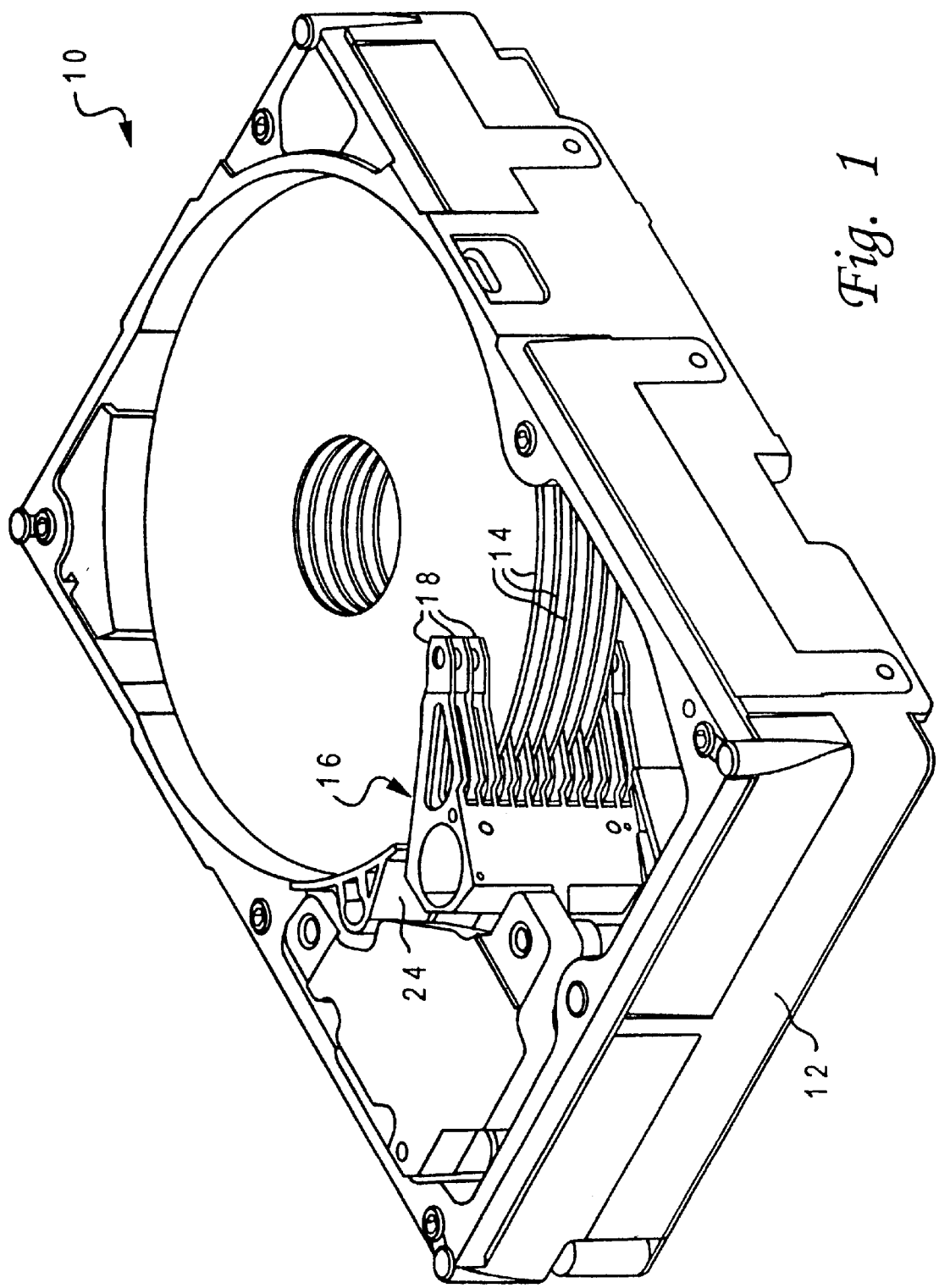
FIG. 1 is a perspective view of one embodiment of a hard disk drive constructed in accordance with the present invention.
Figure 2:
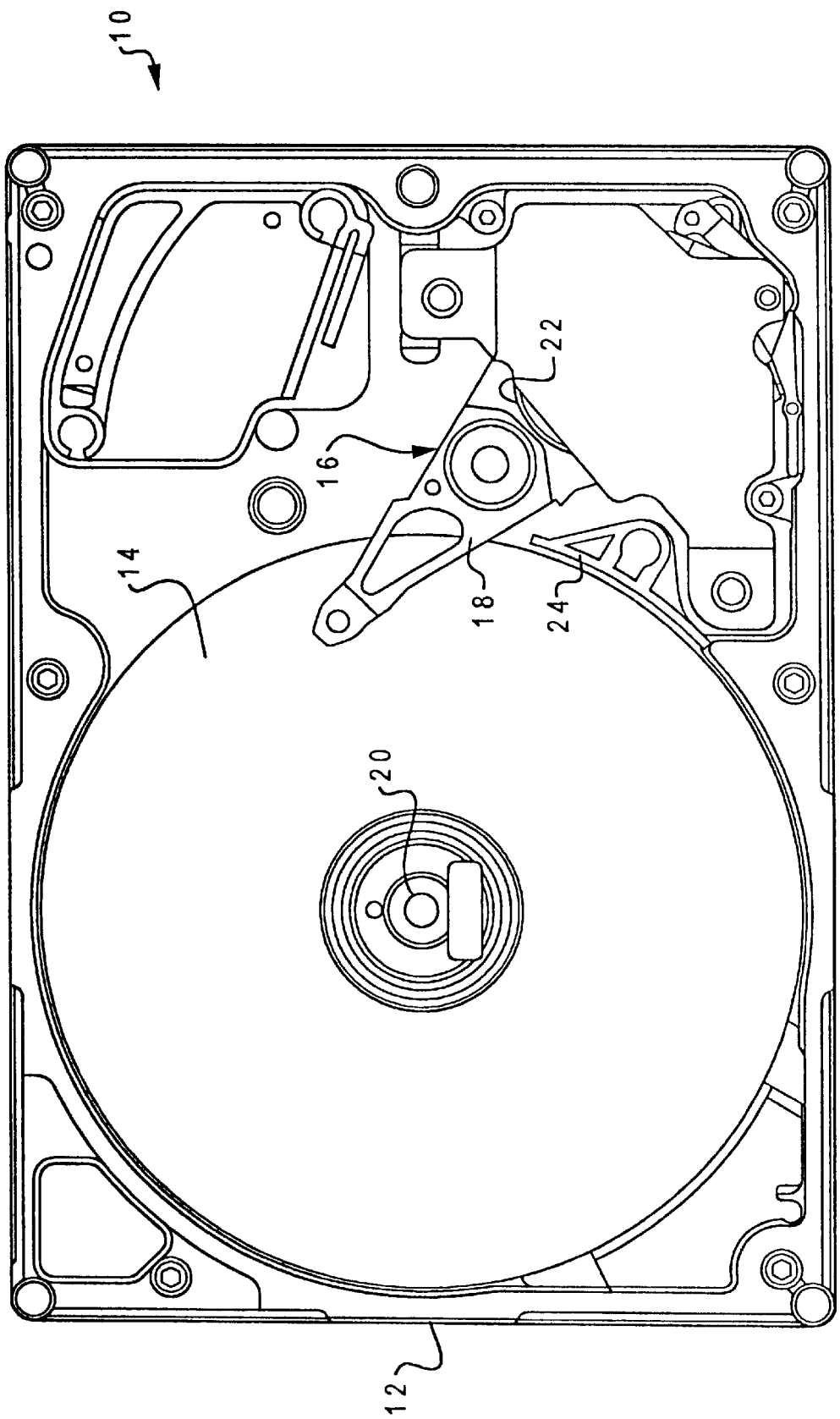
FIG. 2 is a plan view of the hard disk drive of FIG. 1.

With reference now to the figures, and in particular with reference to FIGS. 1 and 2, there is depicted one embodiment 10 of a hard disk drive (HDD) constructed in accordance with the present invention. HDD 10 has several conventional components, including a shroud or enclosure 12, a plurality of disks 14, a rotary actuator assembly 16, and associated control electronics (not shown). A cover which is part of enclosure 12 has been removed in FIGS. 1 and 2. Disks 14 are appropriately mounted on a spindle 20 which is attached to a spindle motor. These components and methods of their fabrication are generally well-known, and are accordingly not discussed at length here. HDD 10 is preferably of the embedded sector servo type.

Rotary actuator assembly 16 has a plurality of arm members 18 supporting electromagnetic transducers at their tips, which are used to read data from and write data to the magnetic media bearing surfaces of disks 14, as is known in the art. The movement of actuator assembly 16 is controlled by a trapezoidal-shaped VCM coil 22 which interacts with permanent magnetics (not shown) that are affixed to the inside of enclosure 12. Coil 22 is wound about an axis that is parallel to the rotational axis of actuator assembly 16. Other conventional features may be used in conjunction with actuator assembly 16, such as latches to secure arm members 18 in a parked position, posts to limit the rotational movement of arm members 18, flex circuits for electrical interconnection of the transducers, etc.

As with prior art VCM coils, coil 22 produces heat during use. The novelty of the present invention lies in an improved method of cooling VCM coil 22, by channeling air flow generated from the spinning disks 14, preferably through the VCM magnetic gap, and thus towards and over coil 22. Such an air channel can be achieved in a variety of ways, such as by machining a slot in the disk cavity wall, or by inserting a separate disk wall part which incorporates such a channel for air flow. FIGS. 1 and 2 depict the latter method, using a shroud insert 24 which is located adjacent disks 14 and proximate to actuator assembly 16.

Figure 3A:
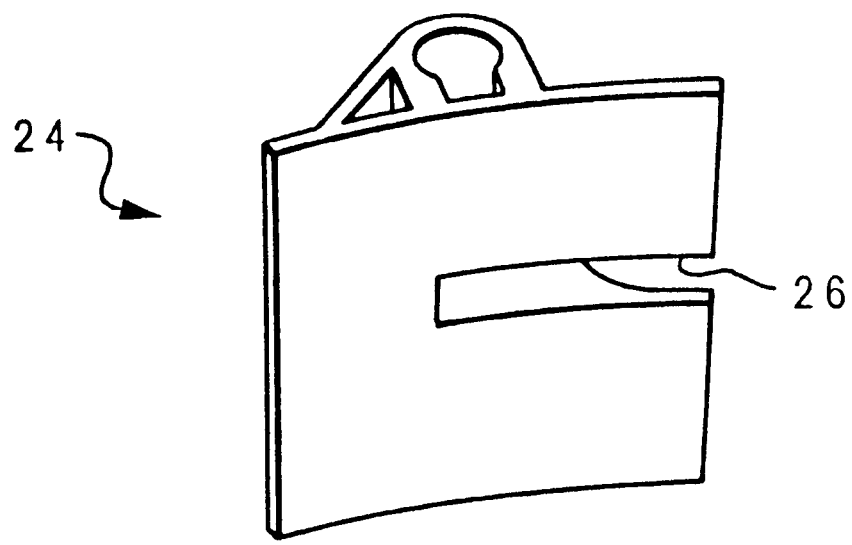
FIGS. 3A and 3B are front and rear perspective views of the air channeling insert used with the hard disk drive of FIGS. 1 and 2.
Figure 3B:
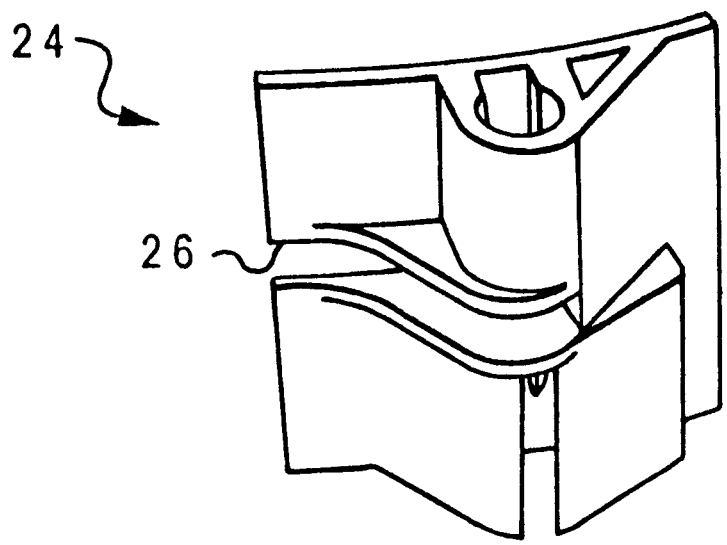

Shroud insert 24 is further depicted in FIGS. 3A and 3B. Insert 24 is preferably constructed of a durable polymeric material, such as polycarbonate, and has formed therein a channel 26 whose geometry is selected to guide air flow from spinning disks 14 toward VCM coil 22. Insert 24 may be secured to enclosure 12 in any convenient fashion, such as by light press fit. Appropriate slots and holes in insert 24 are provided to allow assembly tools to hold it and to place, press and remove the part.

Testing of HDD 10 using insert 24 indicates that the use of insert 24 results in no degradation in flutter track misregistration (TMR), but does result in a 15% reduction in coil temperature as compared to no use of the channeling insert. In other variations of HDD 10, insert 24 may be optimized based upon the particular of geometry/arrangement of disks 14 and actuator assembly 16. Such optimized designs would increase channeling of air flow from the disks to the actuator coil to further enhance convective cooling of the coil. The improved cooling of VCM coil 22 enhances operation of actuator assembly 16 by reducing actuator resistance, which can give reduced move time which speeds I/O access. The use of an insert also facilitates implementation of the present invention in existing HDD designs.

Enclosure 12 is not provided with exterior vents but, since it is not hermetically sealed, it is provided with a conventional breather filter to accommodate changes in ambient pressure due to, e.g., changes in temperature or altitude.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, the present invention might be applied to components of the HDD other than the VCM coil, by appropriately channeling the air flow to those components, and it is applicable to optical disk drives as well as magnetic disk drives. It is therefore contemplated that such modifications can be made without departing from the spirit or scope of the present invention as defined in the appended claims.

We claim:

1. A hard disk drive for a computer system, comprising:

an enclosure;

a plurality of disks, located in said enclosure, each of said disks being generally parallel and arranged to form a stack, and each of said disks having a surface bearing a magnetic medium for storing data, said disks attached to a spindle motor for spinning said disks such that air flow is generated near said surfaces;

an actuator assembly for accessing said data stored on said magnetic media, said actuator assembly including a rotary mounted arm member, a plurality of transducers supported by said arm member, at least one magnet attached to an interior portion of said enclosure, and a wire coil which acts as a solenoid to control movement of said arm member by interacting with said magnet, said wire coil being disposed generally parallel to said disks, supported by said arm member, and positioned adjacent to said stack, midway between a first plane formed by an uppermost disk of said stack and a second plane formed by a lowermost disk of said stack, said first and second planes defining a height of said stack; and an insert located in and supported by said enclosure, said insert having a wall adjacent to a portion of a periphery of said stack, said wall having a parameter and an arcuate surface whose shape is defined by said portion of said periphery, said arcuate surface having a height which is approximately equal to or greater than said height of said stack, and said wall further having a cutout therein, said cutout being elongated, generally parallel to said disks, and extending through said perimeter of said wall, a pair of surfaces formed along either side of said cutout and extending from said wall, away from and parallel to said disks, and a guide surface extending between said pair of surfaces at a forward end of said cutout, said guide surface and said pair of surfaces together forming a channel that directs said air flow away from said disks, said channel is located midway along said height of said stack such that said air flow is directed toward said midway-positioned wire coil.

\* \* \* \* \*